United States Patent
Hanson et al.

(10) Patent No.: US 10,096,184 B2
(45) Date of Patent: Oct. 9, 2018

(54) KEY FOB WITH RSSI

(71) Applicant: Ford Global Technologies, LLC, Dearborn, MI (US)

(72) Inventors: Ryan Edwin Hanson, Livonia, MI (US); Stephen Scott Wieland, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/180,882

(22) Filed: Jun. 13, 2016

(65) Prior Publication Data
US 2017/0358159 A1    Dec. 14, 2017

(51) Int. Cl.
*G07C 9/00* (2006.01)

(52) U.S. Cl.
CPC ............ *G07C 9/00309* (2013.01); *G07C 2009/00984* (2013.01); *Y02D 70/00* (2018.01)

(58) Field of Classification Search
CPC ............ G07C 9/00309; G07C 2209/63; G07C 2009/00984
See application file for complete search history.

(56) References Cited

U.S. PATENT DOCUMENTS

| | | | |
|---|---|---|---|
| 8,547,253 B2 | 10/2013 | Proefke et al. | |
| 8,594,616 B2 | 11/2013 | Gusikhin et al. | |
| 8,896,418 B2 | 11/2014 | Lickfelt | |
| 9,102,296 B2 | 8/2015 | Seiberts et al. | |
| 9,166,730 B2 | 10/2015 | Van Wiemeersch | |
| 2003/0117293 A1* | 6/2003 | Tang | B60R 25/102 340/12.54 |
| 2005/0134426 A1* | 6/2005 | Mullet | E05F 15/77 340/5.7 |
| 2005/0206498 A1* | 9/2005 | Tsui | G07C 9/00182 340/5.71 |
| 2006/0114100 A1* | 6/2006 | Ghabra | E05B 81/78 340/5.61 |
| 2006/0273887 A1 | 12/2006 | Yamamoto | |
| 2007/0162191 A1 | 7/2007 | Matsubara | |
| 2008/0150712 A1 | 6/2008 | Cooprider et al. | |
| 2012/0092129 A1 | 4/2012 | Lickfelt | |
| 2013/0069760 A1 | 3/2013 | Lickfelt | |
| 2016/0031417 A1 | 2/2016 | Kornek et al. | |
| 2016/0325710 A1* | 11/2016 | Honkanen | B60R 25/2081 |

FOREIGN PATENT DOCUMENTS

| | | |
|---|---|---|
| GB | 2496755 A | 5/2013 |
| JP | 2012144905 A | 8/2012 |
| JP | 2013165388 A | 8/2013 |
| JP | 2016000905 A | 1/2016 |

OTHER PUBLICATIONS

Unpublished U.S. Appl. No. 14/991,496, filed Jan. 8, 2016 which is not being furnished herewith, pursuant to the Comissioner's Notice dated Sep. 21, 2004.
Search Report dated Oct. 13, 2017, for GB Patent Application No. GB1709158.8 (4 pages).

* cited by examiner

*Primary Examiner* — Emily C Terrell
*Assistant Examiner* — Rajsheed Black-Childress
(74) *Attorney, Agent, or Firm* — James P. Muraff; Neal, Gerber & Eisenberg LLP

(57) ABSTRACT

A key fob includes: communicator(s), a battery, memory, and processor(s) configured to: find signal strengths of received polls; determine, based on the signal strengths, that the received polls have: (a) increased, (b) decreased, (c) leveled off; and if (a), issue a poll response; if (c), not issue the poll response.

14 Claims, 6 Drawing Sheets

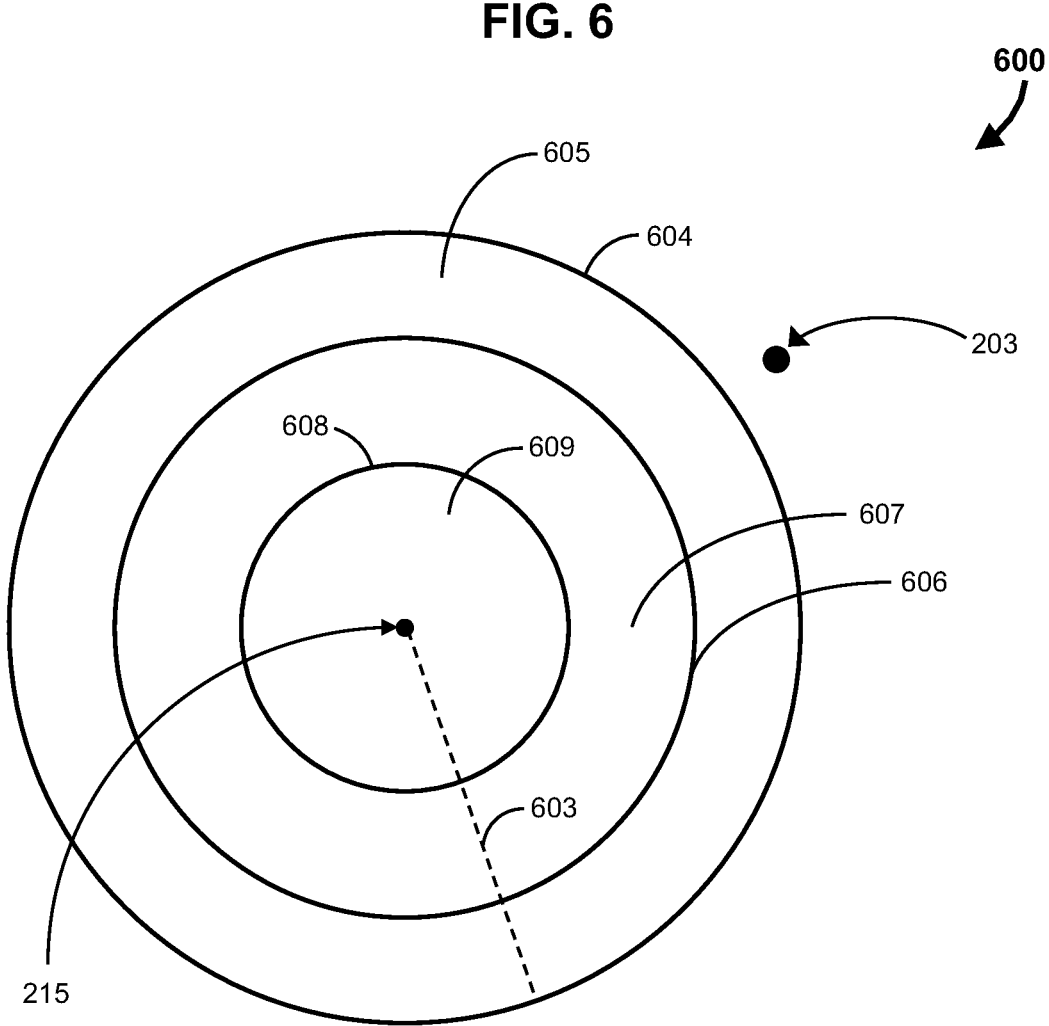

KEY FOB WITH RSSI

TECHNICAL FIELD

This disclosure relates to wireless communication between a base station, such as a vehicle, and a remote device, such as a key fob.

BACKGROUND

Some vehicles are paired with a wireless key fob. These vehicles typically perform an action based on commands sent from the wireless key fob. The key fob includes a battery. The key fob commands drain the battery. A solution is needed to prevent the key fobs from wasting battery by sending unnecessary commands.

SUMMARY

In various embodiments, the present disclosure presents a solution in the form of a key fob including: communicator(s), batterie(s), memory, and processor(s) configured to: find signal strengths of received polls; determine, based on the signal strengths, that the received polls have: (a) increased, (b) decreased, (c) leveled off; and if (a), issue a poll response, if (c), not issue the poll response.

In various embodiments, the present disclosure presents a solution in the form of a method of wireless communication with a key fob including: communicator(s), batterie(s), memory, and processor(s), comprising, with the processor(s): finding signal strengths of received polls; determining, based on the signal strengths, that the received polls have: (a) increased, (b) decreased, (c) leveled off; if (a), issuing a poll response, if (c), not issuing the poll response.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 shows the key fob in relation to the vehicle.

DETAILED DESCRIPTION OF EXAMPLE EMBODIMENTS

Figure 1:
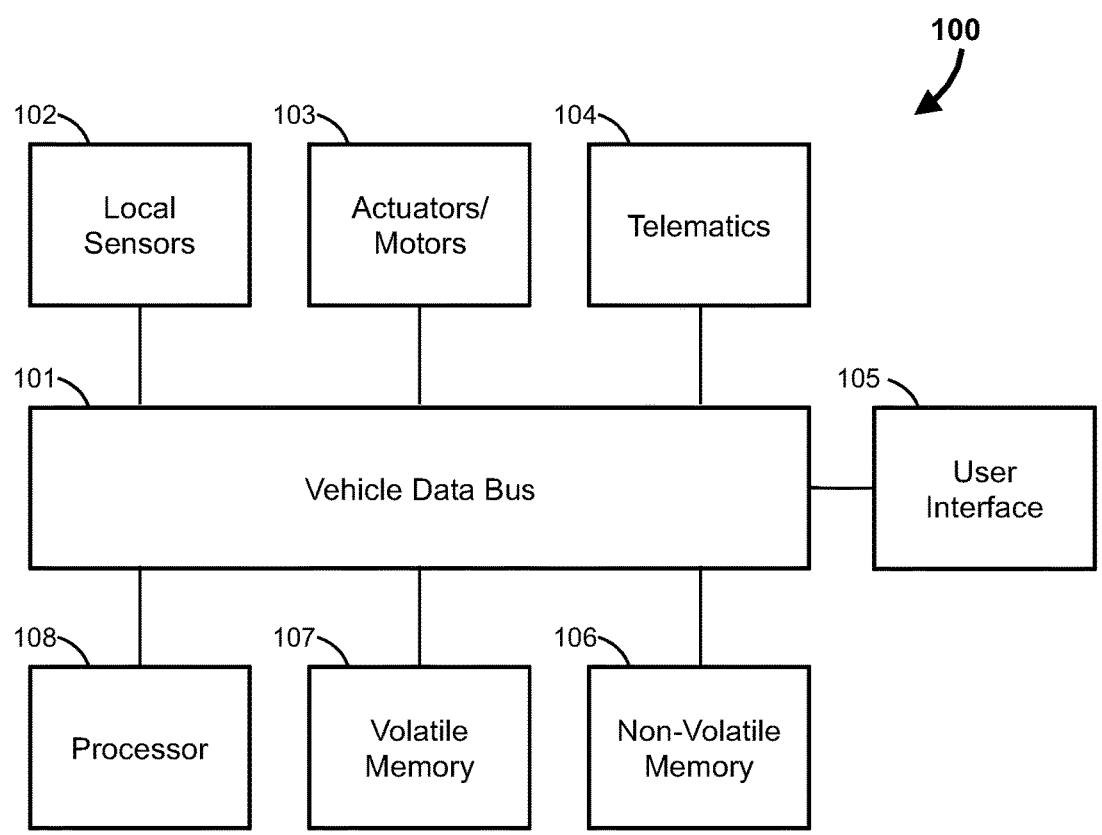
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or" as one possibility and "either or" as another possibility.

FIG. 1 shows a computing system 100 of an example vehicle 215. The vehicle 215 includes a motor, a battery, at least one wheel driven by the motor, and a steering system configured to turn the at least one wheel about an axis. Suitable vehicles 215 are also described, for example, in U.S. patent application Ser. No. 14/991,496, which is hereby incorporated by reference in its entirety. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The actuators/motors 103 produce physical results. Examples of actuators/motors include fuel injectors, windshield wipers, transmissions, airbags, haptic motors, engines, lights (e.g., welcome lights, head lights), etc. The local sensors 102 transmit digital readings or measurements to the processor 108. Examples of suitable sensors include temperature sensors, rotation sensors, seat-belt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in U.S. patent application Ser. No. 14/991,496. In various embodiments, the computing system 100 shares some or all of the features of the vehicle-based computing system pictured in FIG. 1 of U.S. Pat. No. 8,594,616, which is hereby incorporated by reference in its entirety.

It should be appreciated that the vehicle 215 is configured to perform the methods and operations described below. In some cases, the vehicle 215 is configured to perform these functions via computer programs stored on the various volatile or non-volatile memories of the computing system 100. In other words, a processor is configured to perform a disclosed operation when it is in operative communication with memory storing a software program with code or instructions embodying the disclosed operation. Further description of how the processor, memories, and programs cooperate appears in U.S. patent application Ser. No. 14/991,496 and U.S. Pat. No. 8,594,616.

Figure 2:
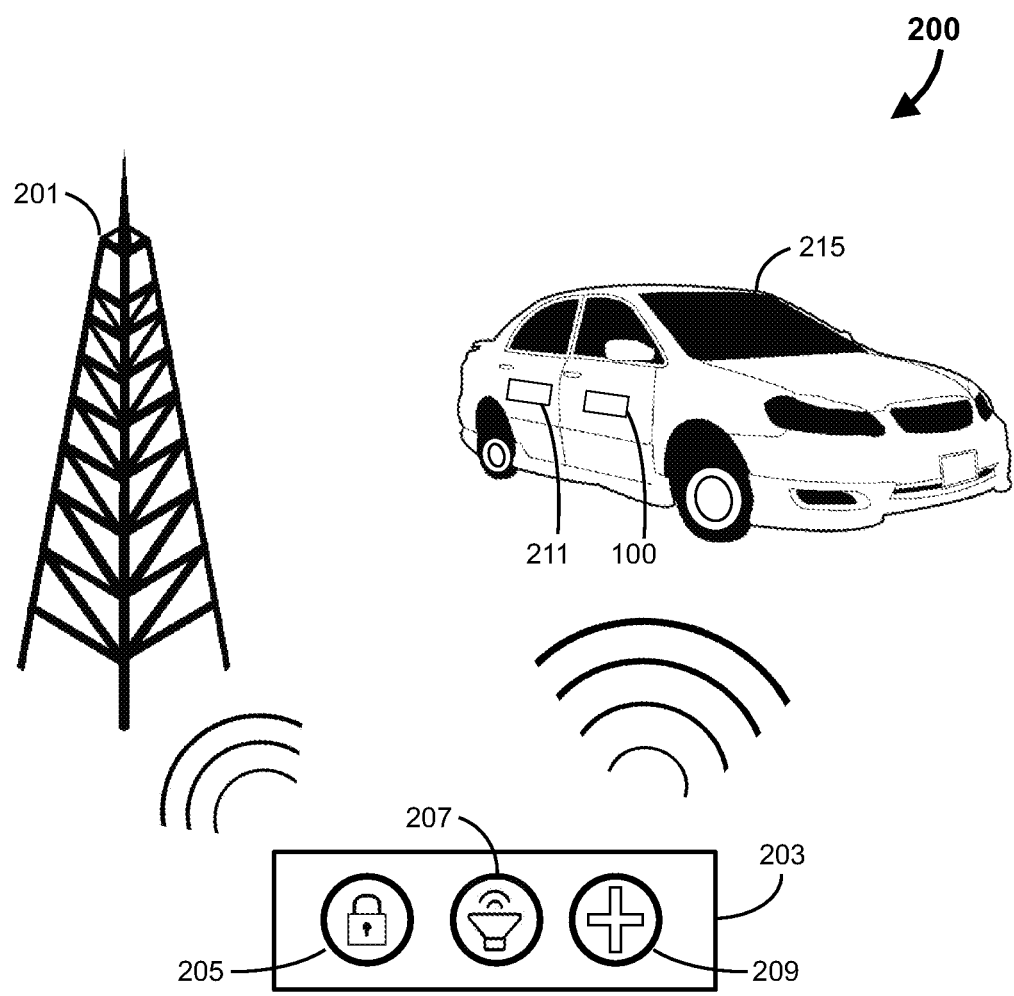
FIG. 2 is a schematic of the vehicle, a key fob paired with the vehicle, and a cell tower.

As described in U.S. Pat. No. 8,594,616, FIG. 2 is a diagram of an exemplary system 200 for a key fob 203. The key fob 203 is equipped with a plurality of buttons. For example, an unlock/lock button 205 enables a vehicle 215 to be locked or unlocked. A panic button 207 enables a user to activate the vehicle's horn and/or headlights. In various embodiments, the key fob 203 and the vehicle 215 communicate via the systems and methods disclosed in U.S. Pat. No. 8,594,616. In various embodiments, the key fob 203 and/or the vehicle 215 share the structure disclosed in U.S. Pat. No. 8,594,616. The key fob 203 and/or the vehicle 215 are configured to directly communicate with a cellular network 201.

As described in U.S. Pat. No. 8,594,616, the key fob 203 communicates with the vehicle 215. The key fob 203 may wirelessly communicate with the vehicle 215 computing system 100 via the telematics unit 104. Alternatively, the key fob 203 may communicate with the vehicle 215 via a dedicated key fob 203 communication device 211 in operative communication with the vehicle 215 computing system 100. Communication between the key fob 203 and the vehicle 215 may be via short-range radio signals via either of the communication device 211 and/or the telematics unit 104. Communication between the key fob 203 and the vehicle 215 is described in greater detail below. It should be appreciated that communication between the key fob 203 and the vehicle 215 is an example and that the below methods can be applied to any two objects in wireless communication. For example, wireless communication between two mobile devices or wireless communication between a mobile device and a base station, such as a server, a computer, or a vehicle.

The vehicle 215 includes welcome lights. The welcome lights are mounted in various locations around the vehicle 215, such as below the vehicle frame. Standard vehicle lights, such as map lights or dome lights, may be configured to function as welcome lights. The welcome lights are typically LEDs. The vehicle 215 is configured to turn on the welcome lights to illuminate the interior and/or exterior of the vehicle 215 when the driver of the vehicle 215 approaches. In other words, the vehicle 215 is configured to turn on the welcome lights well before the driver starts the vehicle 215. Although this specification discusses a vehicle 215, it should be appreciated that these methods can be applied to any case with a key fob connected to a base station (e.g., a house, a boat).

Figure 3:
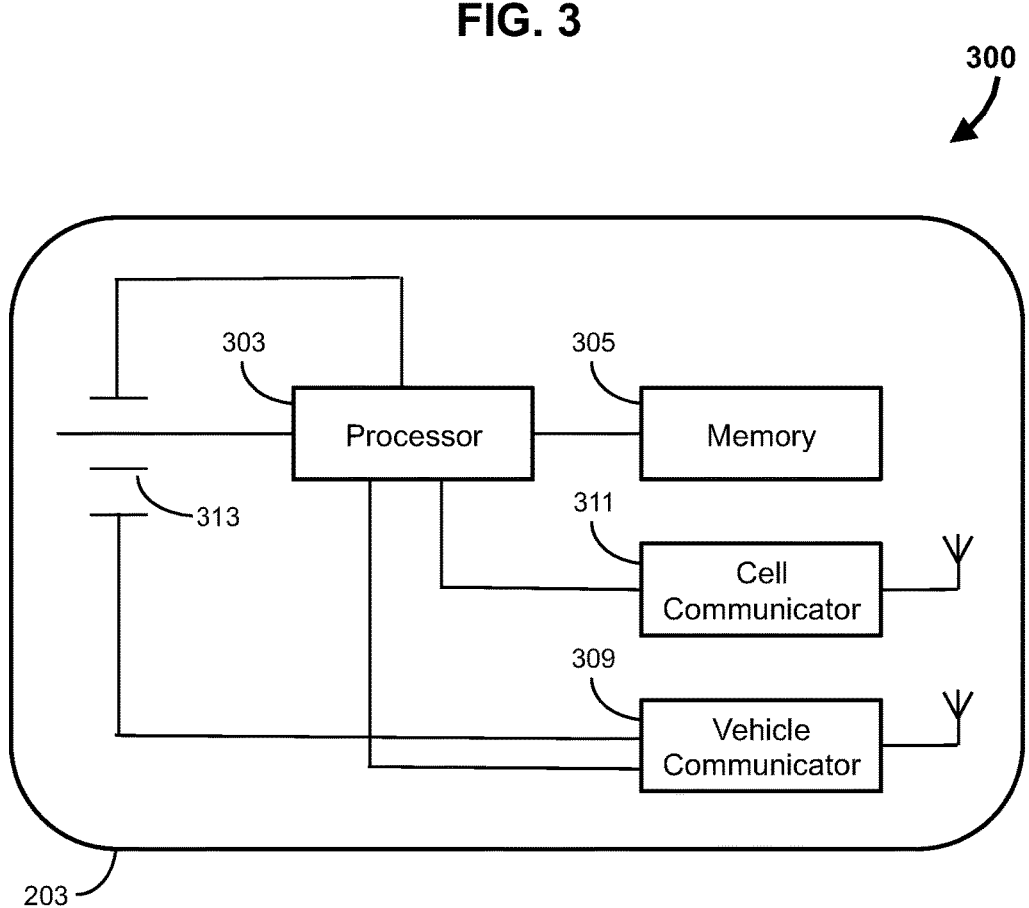
FIG. 3 is a block diagram of the key fob.

FIG. 3 shows electronic components 300 of the key fob 203. The electronic components include a processing unit 303, memory 305, a cell communicator 309, a fob communicator 311, and a battery 313. The cell communicator 309 and the fob communicator 311 may include additional hardware components such as transceivers and transponders. In general, the cell communicator 309 is configured to communicate with the cellular network 201. The vehicle communicator 309 is configured to communicate with the vehicle 215 via one or more of the telematics unit 104 and the dedicated key fob communication device 211. The communication may be via any known wireless communication technology including short range radio broadcasts.

Figure 4:
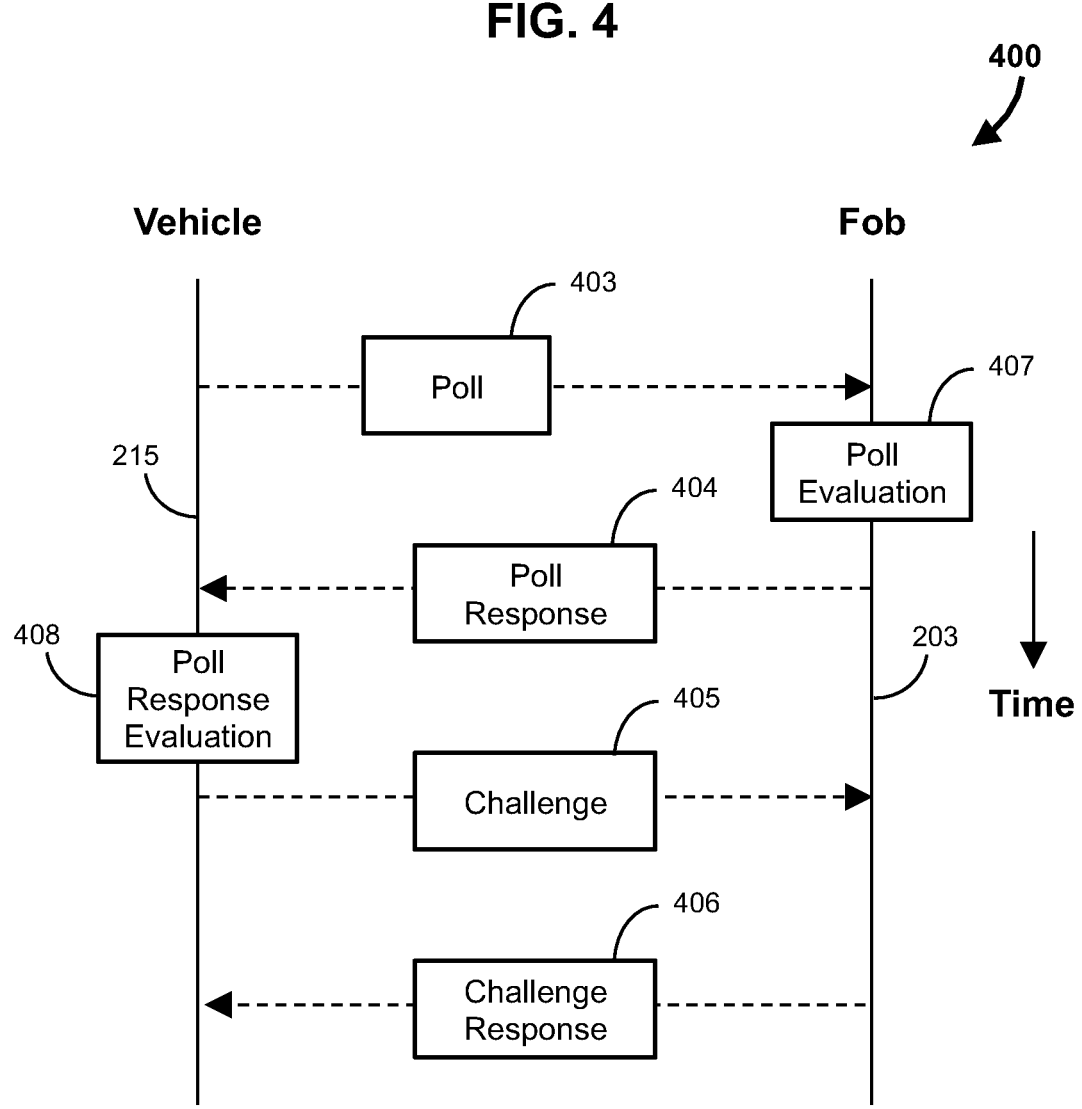
FIG. 4 is a schematic of wireless communication between the vehicle and the key fob.

FIG. 4 shows an example series of communications 400 between the vehicle 215 and the key fob 203. The vehicle 215 periodically broadcasts a poll 403. When the key fob 203 is within range of the poll 403, the key fob 203 responds with a poll response 404. The poll response 404 may include a range of information including one or more of: (a) an identity or transmitter ID code of the key fob 203; (b) a measured signal strength of the poll 403 at the key fob 203; (c) a time that the poll 403 was received at the key fob 203; etc.

In some cases, the vehicle 215 replies to the poll response 404 with a challenge 405. The vehicle 215 may issue the challenge 405 based on information contained in the poll response 404. For example, the vehicle 215 may only issue the challenge when the key fob 203 is within a predetermined distance of the vehicle 215 (as approximated via signal strength or time of flight, both of which are discussed below). The vehicle 215 evaluates the poll response 404 and determines whether to issue the challenge at 408. These functions are further described below with reference to FIG. 6.

The challenge 405 may request additional information from the key fob 203 such as any of (a), (b), (c) identified above. The challenge 405 may task the key fob 203 with decrypting a communication embedded in the challenge 405 to prove the authenticity of the key fob 203. The key fob 203 replies to the challenge 405 with a challenge response 406. The vehicle authenticates the key fob 203 based on the information within the challenge response 406.

The vehicle 215 takes one or more actions based on the poll response 404 and/or the challenge response 406. More specifically, the vehicle 215, based on information embedded in the poll response 404 and/or the challenge response 406 performs one or more of the following: activating the welcome lights, unlocking vehicle doors, and enabling vehicle 215 start. The information embedded in the poll response 404 may be one or more of: the signal strength of the poll 403 as measured by the key fob 203; the time of flight of the poll 403 as measured by the key fob 203; a signal strength of the poll response 404 as measured by the vehicle 215; a time of flight of the poll response 404 as measured by the vehicle 215.

As described above, this information can be used to approximate radial distance of the key fob 203 from the vehicle 215. When the key fob 203 is approximated to be a first distance from the vehicle 215, the vehicle 215 activates the welcome lights. When the key fob 203 is approximated to be a second distance from the vehicle 215, the vehicle 215 unlocks the doors. When the key fob 203 is approximated to be a third distance from the vehicle 215, the vehicle 215 enables a user to start the vehicle 215 (e.g., activates a button mounted on the dashboard that enables a user to start the vehicle 215). The first distance is greater than the second distance, which is greater than the third distance. In various embodiments, the vehicle 215 only issues the challenge 405 when the key fob 203 is approximated to be a second distance or less from the vehicle 215. These functions are further described below with reference to FIG. 6, which is discussed in detail below.

The key fob 203 consumes battery energy to generate the poll response 404. The key fob 203 of the present invention is configured to conserve energy by only issuing a poll response 404 under certain conditions. Prior to issuing the poll response 404, the key fob 203 performs an evaluation 407 of one or more of the signal strength of the poll 403 and the time-of-flight of the poll 403. The key fob 203 transmits the poll response 404 based on the evaluation 407. The evaluation 407 is discussed in greater detail below.

In one embodiment, the key fob 203 applies RSSI technology to measure the power present in the received poll 403. RSSI technology is described for example, in U.S. Publication No. 2008/0150712, which is hereby incorporated by reference in its entirety and U.S. Pat. No. 9,166,730, which is hereby incorporated by reference in its entirety. If the power present in the received poll 403 (as measured via RSSI technology) fails to meet predetermined conditions, then the key fob 203 declines to send the poll response 404.

In one embodiment, the key fob 203 applies time-of-flight of the poll 403 as a proxy for the signal strength of the poll 403. More specifically, the vehicle 215 time-stamps the poll 403. The key fob 203 compares the time of receipt of the poll 403 to the time stamp. This comparison yields time-of-flight of the poll 403. A long time-of-flight indicates low signal strength. It should be appreciated that when this specification discusses signal strength, such a determination can be made via RSSI (e.g., the measured power present in a received poll 403) or via time-of-flight (e.g., the time it takes for a poll 403 to propagate from the vehicle 215 to the key fob 203).

As previously discussed, the key fob 203 is configured to only issue a poll response 404 under certain conditions, as evaluated at 407. In general, the key fob 203 is configured to conserve power or energy by declining to issue a poll response 404 when the key fob 203 is at rest and/or the key fob 203 is moving away from the vehicle 215.

Imagine a case where a driver parks the vehicle 215 in a garage, then hangs the key fob 203 on a key rack within the garage. The key fob 203 is within broadcast distance of the vehicle 215 and therefore will receive the periodic polls 403 from the vehicle 215. If the key fob 203 indiscriminately replied to polls 403 with poll responses 404, then the key fob 203 would consume energy every time the vehicle 215 issued a poll 403. The key fob 203 would thus waste energy and drain the key fob battery 313 while hanging on the garage key rack.

As described above, the key fob 203 of the present invention does not indiscriminately reply to polls 403 with poll responses 404. More specifically, the key fob 203 processor 303 (via execution of programs stored on the key fob 203 memory 305) is configured to evaluate the signal strength of a poll 403 to approximate whether the key fob 203 is stationary. In various embodiments, if the key fob 203 has been stationary for more than a predetermined amount of time, then the key fob 203 automatically disables the key fob poll responses 404. This feature is further explained with reference to FIGS. 5 and 6.

Figure 5A:
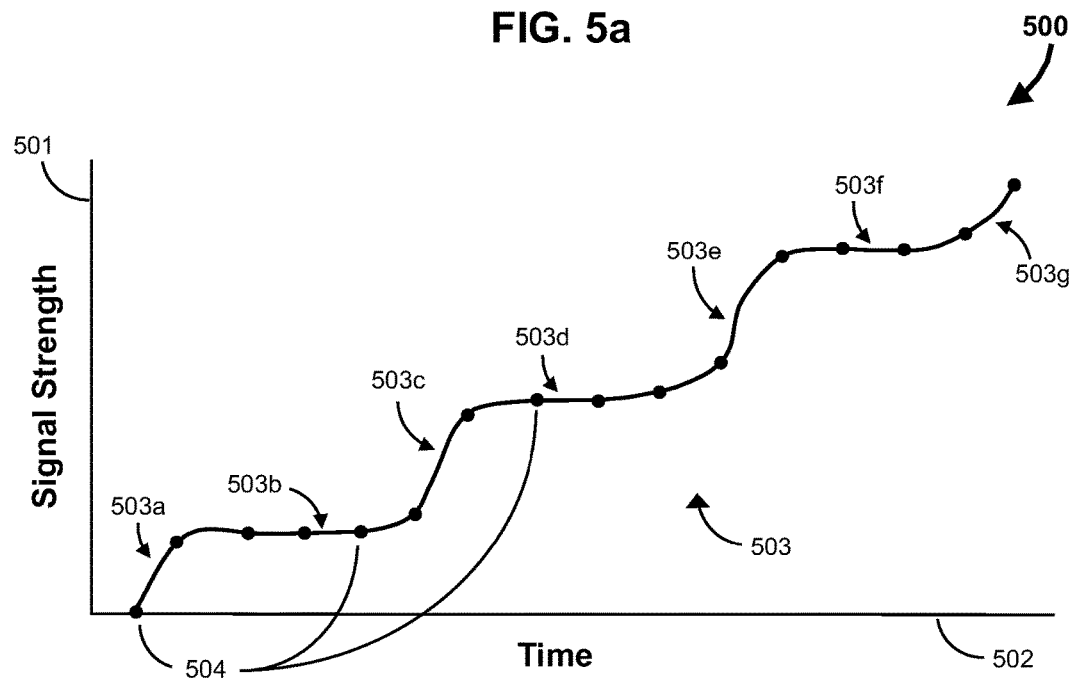
FIGS. 5a and 5b are graphs of signal strengths measured at the key fob.

FIG. 5a is a graph 500 of example signal strengths measured at a key fob 203. The graph 500 includes a signal strength Y axis 501, a time X axis 502, and a signal strength curve 503. As shown in FIG. 5a, the key fob 203 builds the signal strength curve 503 by connecting a series of discrete signal strengths 504. As described above, each discrete signal strength 504 is a measurement, at the key fob 203, of the signal strength of a poll 403. Because the vehicle 215 periodically issues polls (e.g., once every second, every five seconds, every ten seconds, every minute, etc.), the key fob 203 can store and record a series of discrete signal strengths 504. In some embodiments, the key fob 203 stores a predetermined maximum number of these discrete signal strengths 504 in a first-in-first-out basis such that a newest discrete measurement overwrites an oldest discrete measurement.

As shown in FIG. 5, the curve 503 includes seven portions. A first portion 503a represents an increase in signal strength and thus indicates that the key fob 203 has moved toward the vehicle 215. A second portion 503b represents a leveling off of signal strength and thus indicates that the key fob 203 is likely stationary with respect to the vehicle 215. A third portion 503c represents an increase in signal strength and thus indicates that the key fob 203 has become closer to the vehicle 215. A fourth portion 503d represents a leveling off of signal strength and thus indicates that the key fob 203 is likely stationary with respect to the vehicle 215. A fifth portion 503e represents an increase in signal strength and thus indicates that the key fob 203 has become closer to the vehicle 215. A sixth portion 503f represents a leveling off of signal strength and thus indicates that the key fob 203 is likely stationary with respect to the vehicle 215. A seventh portion 503g represents an increase in signal strength and thus indicates that the key fob 203 has become closer to the vehicle 215. Although a decrease in signal strength is not shown in FIG. 5a, it should be appreciated that a decrease in signal strength would occur when the key fob 203 has moved away from the vehicle 215.

The key fob 203 is configured to segment the curve 503 into portions, such as the above identified portions. More specifically, the key fob 203 is configured to segment the curve into increasing portions (e.g., 503a, 503c, 503e, and 503g), leveling off portions (e.g., 503b, 503d, and 503f), and decreasing portions (not shown). The key fob 203 is configured to segment the portions by applying upper and lower boundaries to the discrete signal strengths 504, as discussed below. In cases where a predetermined recalculation number is 1 (discussed below), the key fob 203 beings a new portion when a new discrete signal strength 504 falls outside of one of the upper and lower boundaries. In cases where a predetermined recalculation number is more than 1 (e.g., 3), the key fob 203 begins a new portion when at least the predetermined recalculation number (in this case, 3) of consecutive signal strengths 504 fall outside of the upper and lower boundaries.

In various embodiments, the key fob 203 deletes or discards portions of the curve preceding the most recent portion. In the example of FIG. 5a, the key fob 203 would have discarded or deleted the discrete measurements representing portions 503a, 503b, 503c, 503d, 503e, and 503f. In various embodiments, the key fob 203 deletes or discards portions of the curve preceding the last two most recent portions. In the example of FIG. 5a, the key fob 203 would have discarded or deleted the discrete measurements representing portions 503a, 503b, 503c, 503d, and 503e. This memory storage algorithm can be implemented as an alternative or in addition to the first-in-first-out storage algorithm previously discussed.

The key fob 203 is configured to issue the poll response 404 based on the evaluation 407. Different evaluation methods will now be discussed. As previously noted, the key fob 203 is configured to perform these different evaluation methods. In some embodiments, the key fob 203 is configured to perform these evaluation methods in the following way: programming embodying the different evaluation methods is stored on the key fob 203 memory; the key fob processor 303 is configured to execute the programs and thus cause the key fob 203 to perform the disclosed methods.

Figure 5B:
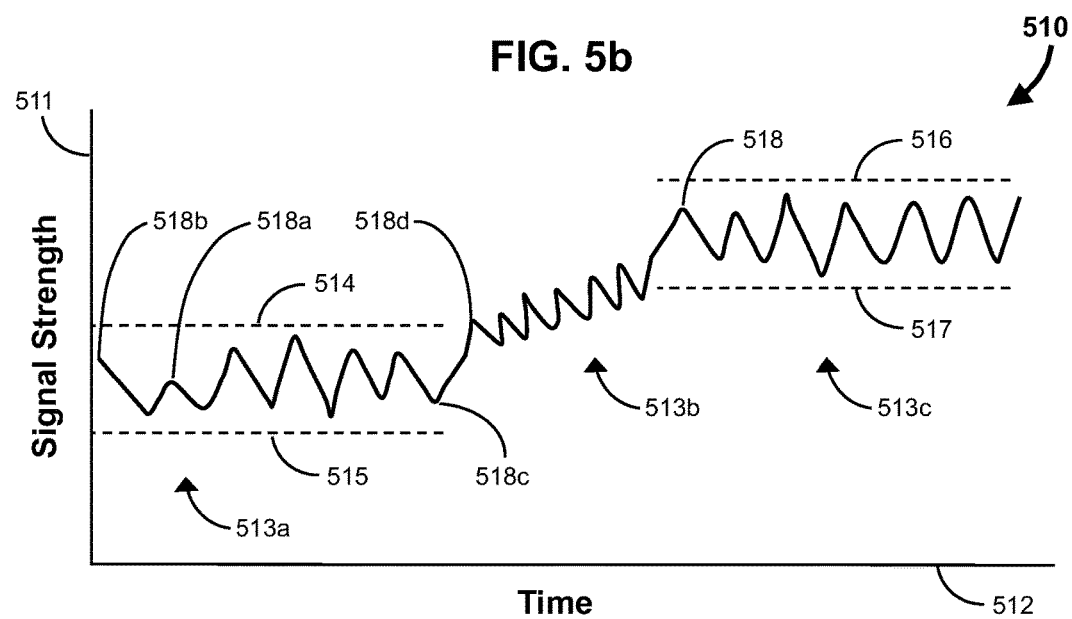

FIG. 5b is a graph 510 of example discrete signal strengths measured at the key fob 203. The graph 510 includes a signal strength Y axis 511, a time X axis 512, and a signal strength curve 513. As shown in FIG. 5b, the signal strength curve 513 is comprised of discrete signal strengths 518 linked together to form the curve 513. The discrete signal strengths 518 are more scattered than the discrete signal strengths 504 of FIG. 5a. The curve includes a first portion 513a where the signal strength curve 513 has level off, a second portion 513b where signal strength curve 513 is increasing and a third portion 513c where signal strength curve 513 has leveled off. Boundaries include upper boundaries 514 and 516 and lower boundaries 515 and 517.

First evaluation method: The key fob 203 sets upper and lower boundaries based on the first or last discrete signal strength 518 that fell outside of the last upper and lower boundaries (i.e., the relevant discrete signal strength). The key fob 203 does not change the upper and lower boundaries until a predetermined recalculation number of discrete signal strengths 518 (the predetermined recalculation number can be 1) fall outside the upper and lower boundaries. The key fob 203 now resets the upper and lower boundaries based on either the first discrete signal strength 518 that fell outside of the upper and lower boundaries or the last discrete signal strength 518 that fell outside of the upper and lower boundaries (this could be applied in a case where the predetermined recalculation number is greater than 1). The upper and lower boundaries can be preset absolute values (e.g., ±3 db above/below the relevant discrete signal strength) or they can be percentage values of the discrete signal strength (e.g., ±10% of the relevant discrete signal strength). When at least a predetermined evaluation number of discrete signal strengths fall within the upper and lower boundaries, then the key fob 203 is determined to be at rest.

With reference to FIG. 5b, imagine that the last measured discrete signal strength was discrete signal strength 518a (the discrete signal strengths to the right of discrete signal strength 518a would be absent). The upper and lower boundaries would be above and below discrete signal strength 518b, not 518a. This is because all discrete signal strengths 518 after 518b fell within the upper and lower boundaries 514 and 515 set with reference to 518b.

As previously discussed, when at least the predetermined evaluation number of discrete signal strengths consecutively fall within the upper and lower boundaries, then the key fob 203 is determined to be at rest. Upper and lower boundaries would only be recomputed once the key fob 203 detected discrete signal strength 518d (assuming the predetermined recalculation number is 1), which falls outside of the upper boundary 514. If the predetermined recalculation number is 2, then the upper and lower boundaries would only be computed once the key fob detected two consecutive discrete signal strengths exceeding the presently applied or enforced boundaries 514 and 515.

Second evaluation method: The key fob 203 sets upper and lower boundaries based on a running average of a predetermined running number of the last discrete signal strengths comprising a single portion of the curve 513. In some cases, the predetermined running number is a maximum such that the running average is always recalculated when a predetermined recalculation number (which can be 1) of discrete signal strengths fall outside of the upper and lower boundaries.

The upper and lower boundaries can be preset absolute values (e.g., ±3 db above/below the running average) or they can be percentage values of the discrete signal strength (e.g., ±10% of the running average). With reference to FIG. 5b, imagine that discrete signal strength 518c was the last measured signal strength. In this case (assuming the predetermined running maximum number was high enough), every measurement from 518b to 518c would be grouped together and averaged to generate boundaries 514 and 515.

Now imagine that discrete signal strength 518d was the next measured signal strength and the predetermined recalculation number was 1. 518d exceeds the upper boundary 514. Now, the upper and lower boundaries would be discarded and a new running average would begin to be calculated starting with 518d. When at least a predetermined number of discrete signal strengths fall within the upper and lower boundaries, then the key fob 203 is determined to be at rest (i.e., signal strength has leveled off).

The key fob 203 determines that it is moving away from the vehicle 215 when discrete signal strengths continuously fall below a series of lower boundaries. Thus, in cases where the key fob 203 only replies to a poll 403 with a poll response 404 when the key fob 203 is moving toward the vehicle 215, the key fob 203 only replies to a poll 403 when the poll 403 (assuming the predetermined recalculation number is 1) exceeds an upper boundary (i.e., the key fob 203 has detecting an increasing portion of the curve 513). In other words, the key fob 203 does not reply to a poll 403 with a poll response 404 when a new discrete signal strength falls below a lower boundary (although the key fob 203 will reset the upper and lower boundaries based on the new discrete signal strength if the predetermined recalculation number is 1). In cases where the key fob 203 responds to a poll 403 when the key fob 203 is moving toward or away from the vehicle 215, then the key fob 203 issues a poll response 404 whenever (assuming the predetermined recalculation number is 1) a new discrete signal strength falls outside of the presently applied or enforced upper boundary or the presently applied or enforced lower boundary.

FIG. 6 shows a geometry 600 of the key fob 203 with respect to the vehicle 215. The outer range of the vehicle polls is 604. After 604, the vehicle 215 polls are too attenuated for the key fob 203 to recognize. When the key fob 203 crosses a first signal fence 606, the vehicle 215 performs a first function. When the key fob 203 crosses a second signal fence 608, then the vehicle 215 performs a second function. The first function can be turning on the welcome lights. The second function can be unlocking the vehicle 215 doors. It should be appreciated that numerical values representing the signal fences 606 and 608 are preprogrammed into the key fob 203, such that the key fob 203 can compare a detected discrete signal strength against the numerical values to approximate its location with respect to the vehicle 215.

First zone 605 is the donut-shaped area between outer range 604 and first signal fence 606. Second zone 607 is the donut-shaped area between the first signal fence 606 and the second signal fence 608. Third zone 609 is the circle-shaped area inside the second signal fence 608. The key fob 203 and/or the vehicle 215 determine/approximate the radial location 603 of the key fob 203 with respect to the vehicle 215 based on the discrete signal strength measurements of the key fob 203.

The key fob 203 may adjust how the evaluation is performed based on its detected location with respect to the vehicle 215. More specifically, the key fob 203 may perform a first evaluation in first zone 605, a second evaluation in second zone 607, and a third evaluation in third zone 609. As one example, the key fob 203 may decline to send any poll responses 404 when the key fob 203 is in first zone 605. The key fob 203 may decline to send poll responses 404 when the key fob 203 is stationary and/or the key fob 203 is moving away from the vehicle 215 in the second zone 607. The key fob 203 may decline to send poll responses 404 when the key fob 203 is stationary in third zone 609, but still send poll responses 404 when the key fob 203 is moving toward or away from the vehicle 215 in third zone 609.

As another example, the key fob 203 may decline to send any poll responses 404 when the key fob 203 is in first zone 605. The key fob 203 may decline to send poll responses 404 when the key fob 203 is stationary in the second zone 607. Here, the key fob 203 would still send poll responses 404 when the key fob 203 is moving away from the vehicle 215 in second zone 607. The key fob 203 may decline to send poll responses 404 when the key fob 203 is stationary and/or the key fob 203 is moving away from the vehicle 215 in third zone 609.

It should be appreciated that any one the first evaluation, second evaluation, and third evaluation include one of: (a) indiscriminately sending poll responses; (b) only sending poll responses when the key fob 203 is moving toward the vehicle 215; (c) sending poll responses when the key fob 203 is moving, but not sending poll responses when the key fob 203 is stationary; (d) never sending poll responses, no matter whether the key fob 203 is stationary or moving.

It should be appreciated that the vehicle 215 may base the challenge 405 on the detected position of the key fob 203 so that the vehicle 215 only sends the challenge when the key fob 203 is within one or more of the third zone 609 and the second zone 607. Alternatively or in addition, the key fob 203 may only reply to a challenge 405 when the key fob 203 is within one or more of the third zone 609 and the second zone 607.

It should be appreciated that the methods discussed above with reference to the evaluation of the poll responses may apply alternatively or in addition to the challenge responses. More specifically, the key fob 203 may determine whether to send a challenge response 406 based on any of the above methods related to the poll response 404. The criteria for evaluation of the challenge response may differ from the criteria for evaluation of the poll response such that the key fob 203 performs one type of evaluation for the poll response 404, but a second type of evaluation for the challenge response 406. The first type of evaluation can include any of the above methods. The second type of evaluation can include any of the above methods. The first type of evaluation can be different than the second type of evaluation.

For the purposes of the claims the term "batterie(s)" is hereby defined to mean "one or more batteries."

The invention claimed is:

1. A key fob comprising:
   communicator(s) to receive received polls from and issue a poll response to a vehicle;
   one or more batteries; and
   processor(s) configured to:
      identify signal strengths of the received polls;
      compute applied upper and lower boundaries based on the received polls;
      determine whether the received polls have increased, decreased, or leveled off by comparing the signal strengths to the applied upper and lower boundaries;
      if the received polls have increased above the applied upper boundary, issue the poll response to the vehicle via the communicator(s);
      if the received polls have decreased below the applied lower boundary or leveled off between the applied lower and upper boundaries, not issue the poll response to conserve the one or more batteries;
      discard the applied upper and lower boundaries when a predetermined recalculation number of the received polls falls outside of the applied upper and lower boundaries; and
      recompute the applied upper and lower boundaries based on a running average of the received polls, the running average including only the received polls falling within the applied upper and lower boundaries.

2. The key fob of claim 1, wherein the processor(s) are configured to: adjust the applied upper and lower boundaries based on new received polls falling within the upper and lower boundaries.

3. The key fob of claim 1, wherein processor(s) are configured to approximate locations of the key fob based on the received polls.

4. The key fob of claim 1, wherein the processor(s) are configured to:
   group the received polls into increasing segments, decreasing segments, and leveling off segments.

5. The key fob of claim 1, wherein, if the received polls have increased above the applied upper boundary, the communicator causes the vehicle to activate a first event when the key fob is at a first position approximate to the vehicle, a second event when the key fob is at a second position approximate to the vehicle, and a third event when the key fob is at a third position approximate to the vehicle.

6. The key fob of claim 5, wherein the first event is activation of welcome lights, the second event is an unlocking of doors, and the third event is activation of a vehicle start button.

7. The key fob of claim 1, wherein the processor(s) are configured to determine that the received polls have leveled off between the applied upper and lower boundaries upon determining a predetermined evaluation number of the received polls has fallen within the applied upper and lower boundaries.

8. A method of wireless communication with a key fob including:
   receiving, via a communicator of a key fob, received polls from a vehicle;
   identifying, via a processor of the key fob, signal strengths of the received polls;
   computing applied upper and lower boundaries based on the received polls;
   determining, via the processor, whether the received polls have increased, decreased, or leveled off by comparing the signal strengths to the applied upper and lower boundaries;
   approximating locations of the key fob based on the received polls;
   issuing, if the received polls have increased above the applied upper boundary, a poll response to the vehicle via the communicator;
   issuing the poll response via the communicator if the received polls have decreased below the applied lower boundary and the key fob is at a first location;
   not issuing the poll response if the received polls have decreased below the applied lower boundary and the key fob is at a second location that is farther from the vehicle than the first location to conserve energy of a battery of the key fob;
   not issuing, if the received polls have leveled off between the applied upper and lower boundaries, the poll response to conserve energy of a battery of the key fob;
   discarding the applied upper and lower boundaries when a predetermined recalculation number of the received polls falls outside of the applied upper and lower boundaries; and
   recomputing the applied upper and lower boundaries based on a running average of the received polls, wherein the running average of the received polls only includes received polls falling within the applied upper and lower boundaries.

9. The method of claim 8, comprising: grouping the received polls into increasing segments, decreasing segments, and leveling off segments; and performing an operation based on a present grouping.

10. The method of claim 8, further comprising, in response to determining that the received polls have increased, causing the vehicle to:
activate a first vehicle event upon determining that the key fob is spaced apart from the vehicle by a first distance;
activate a second vehicle event upon determining that the key fob is spaced apart from the vehicle by a second distance greater than the first distance; and
activate a second vehicle event upon determining that the key fob is spaced apart from the vehicle by a third distance greater than the second distance.

11. The method of claim 8, further comprising determining that the received polls have leveled off responsive to determining a predetermined evaluation number of the received polls has fallen within the applied upper and lower boundaries.

12. A key fob comprising:
a communicator;
a processor to:
identify signal strengths of polls received from a vehicle via the communicator;
issue a poll response via the communicator if the signal strengths increased above an upper boundary; and
not issue the poll response if the signal strengths decreased below a lower boundary or leveled off between the boundaries; and
discard the boundaries when a predetermined number of the polls falls outside of the boundaries.

13. The key fob of claim 12, wherein the processor is to compute the boundaries based on the received polls.

14. The key fob of claim 12, wherein the processor is to recompute the boundaries based on a running average of the polls, the running average including only the polls falling within the boundaries.

* * * * *